Inventor
Alex Paulsen

His Attorneys

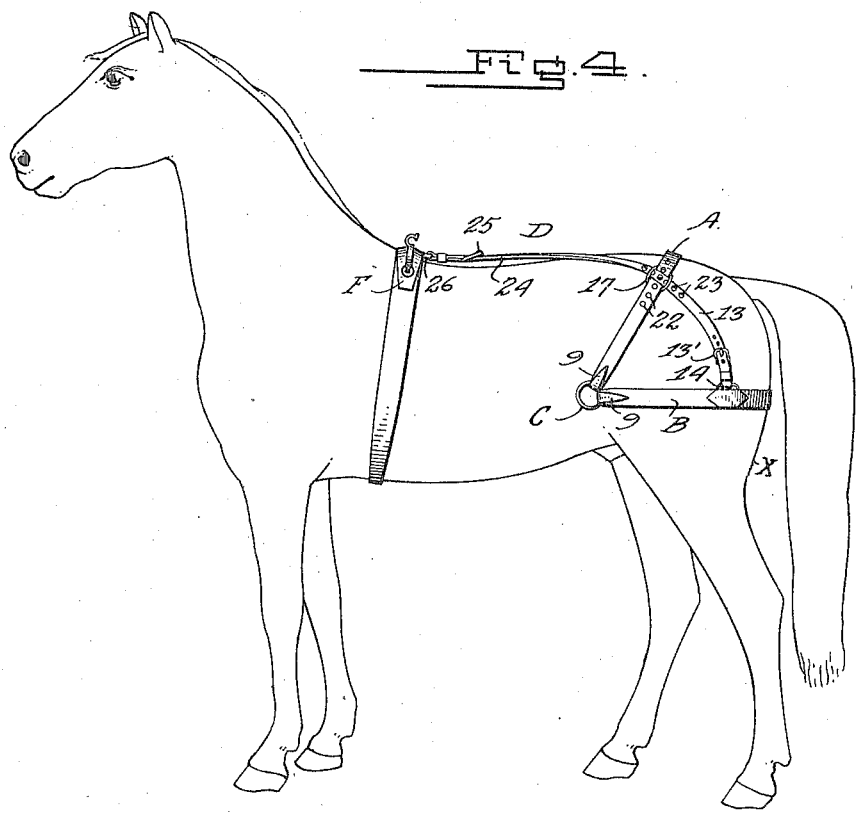
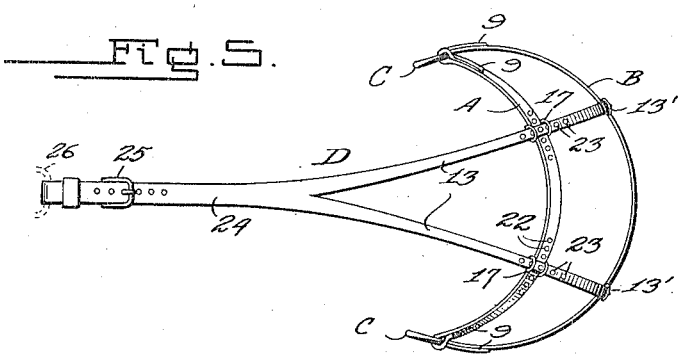

UNITED STATES PATENT OFFICE.

ALEX PAULSEN, OF DETROIT, MICHIGAN.

BREECHING.

1,181,031.                Specification of Letters Patent.    Patented Apr. 25, 1916.

Application filed December 23, 1915. Serial No. 68,350.

*To all whom it may concern:*

Be it known that I, ALEX PAULSEN, a citizen of the United States, residing at Detroit, in the county of Wayne and State of Michigan, have invented a new and useful Breeching, of which the following is a specification.

My present invention relates to breeching suitable for practically all types of harness used on draft animals.

The principal object of the invention is to enable the draft animal to hold back the load by providing breeching retained in such a position that the rear portion of the animal more effectively counteracts force, thereby bringing into use the weight of the animal as well as permitting the animal to adjust the muscles more readily to accomplish the holdback action.

Other objects of the invention are to provide breeching which may be more readily adjusted to the contour of the draft animal, at its rear portion; to provide such which is inexpensive to manufacture, effecting a saving in leather, stitching, and metallic parts; to provide breeching which may be easily cleaned and maintained in good repair owing to the few seams required; and, to provide such breeching without a housing or the like.

In connection with breeching now in common use many accidents occur due to the animal throwing its head to one side or the other, in an effort to remove flies or other insects. This action causes the backstrap now in common use to become slack at the side to which the animal throws its head and is very apt to result in the teeth or parts of the bridle being caught, and as a result frightening the animal. In some instances this has ultimately resulted in the death of the animal, by its falling in the direction to which the head was thrown, the animal falling upon its head which could not be released, and breaking its neck.

Another object of my invention is to so dispose the backstrap, when a plurality of such are used, that by such action, the particular backstrap at the side to which the animal throws its head, will be drawn more tight, rather than become slackened, avoiding accidents.

Figure 1:
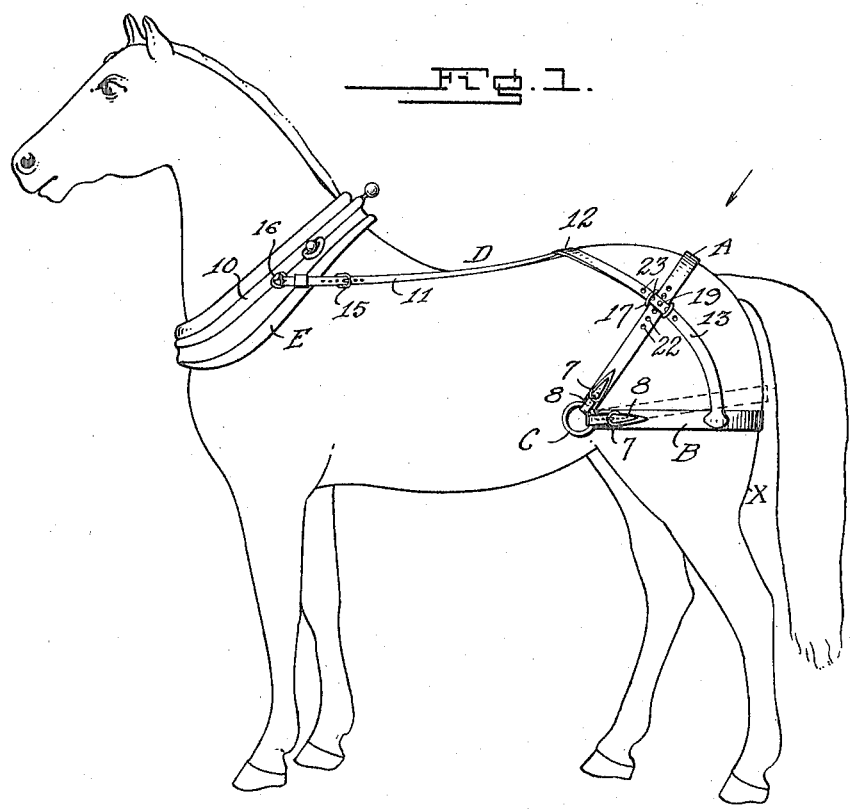
Figure 2:
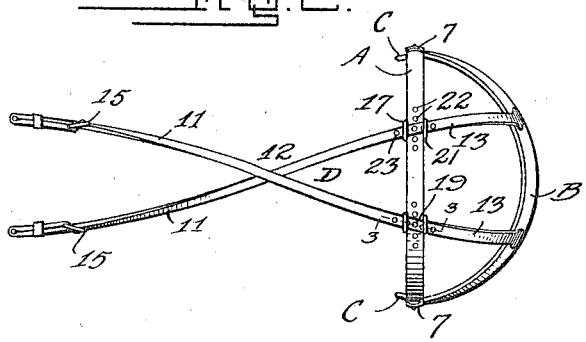
Figure 3:
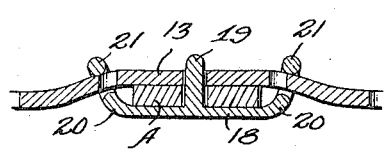

Further objects of the invention will appear in the following detailed description, taken in connection with the accompanying drawings, forming a part of this specification, and in which drawings:

Figure 1 is a side elevation of breeching constructed according to my invention and shown applied to a horse. Fig. 2 is a top plan view of said breeching, looking in the direction of the arrows shown in Fig. 1. Fig. 3 is a sectional view on the line 3—3 of Fig. 2. Fig. 4 is a view similar to Fig. 1 showing a modification. Fig. 5 is a plan view of such modification. Fig. 6 is a longitudinal sectional view showing a modified means of connecting the backstrap to a fore member of the harness, concerned with the modification shown in Fig. 4.

In the drawings, where similar characters refer to similar parts throughout the several views, A designates an upper breech strap; B a lower breech strap; C breeching rings to which said straps are connected, said straps being disposed at an acute angle with respect to each other; and, D, means for adjustably retaining straps A and B in spaced relation, and at a substantially set distance from fore parts of the harness, such as a collar E, as shown in Fig. 1, or a back pad F, as shown in Fig. 4.

It is now common practice to support the breech strap B by means of a relatively light hip strap or a plurality of such straps resting upon the back of the animal, and in a holdback action, the hips of the animal act like a pulley for the hip straps intermediate the collar or other fore member of the harness and the holdback strap. The pull on the holdback strap amounts to only about half the strain put upon the breeching, the other half being spent pulling back on the collar. This does not lessen the animal's backing power much, but it has a tendency to double up the animal, making the breeching too long thus causing it to be pulled backward and downward, so that it engages the rear part of the rear legs, at about the point marked X in Figs. 1 and 4. All this has a tendency to pull the legs from under the animal. Therefore, with one of the principal objects of my invention in view, the upper and lower breech straps are brought into use and there retained by means D so that the lower strap B is, at all times, held at substantially the position shown in the drawings, where it is most effective, and both straps A and B serve to directly aid in the holdback action.

The straps A and B may be adjustably connected with rings C and by buckles 7 and straps 8, or they may be rigidly connected as by looping the straps through the rings and securing ends, as clearly shown at 9 in Fig. 4. By this arrangement one strap is movable with respect to the other and they extend from the rings at an acute angle, the upper strap crossing the back of the animal preferably to the rear of the crown thereof, as clearly shown in Fig. 1. This enables the animal to set the muscles at the rear portion of its body so that both straps may directly aid in the holdback action.

Referring now to the form shown in Fig. 1 where the breeching is operatively connected with the collar E, and more particularly with the hames 10, it is to be distinctly understood that by reference to the fore member of the harness, I refer to any suitable member which will afford an anchor for back straps 11 hereinafter more specifically referred to. These back straps 11 cross each other in advance of breech strap A as shown at 12, extensions 13 of the back straps having engagement with strap A and connected in any suitable manner to strap B, as by stitching, or they may be adjustably connected therewith, as shown in Fig. 4 by means of return buckle 13', the strap being looped through a suitable hanger 14. Adjustable connection of the straps 11 with the fore member E of the harness may be accomplished by each being provided with a return buckle 15, the straps being looped through suitable ring 16, such as that mounted on the hames 10.

As to means D, in addition to including the strap extensions 13 it comprises suitable devices 17, one for each strap extension, adapted to hold breech strap A in an adjusted position with respect to breech strap B. This device 17, more clearly shown in Fig. 3, embodies a main body portion 18 from which extends a lug 19 and projections 20 and 21, which embrace the straps A and 13 respectively. Strap A is provided with two sets of perforations 22 disposed intermediate its ends, while each strap 13 is provided with a set of perforations 23 at that portion where it has engagement with the strap A, any one of the perforations of set 23 being capable of alinement with any one of the perforations of set 22. In this way the lug 19 may be passed through the alined perforations and the two straps held in adjusted relation. It is to be understood, however, that I may substitute any suitable device for that designated by character 17, whereby the parts may be held in adjusted relation.

Referring now to the modifications shown in Figs. 4-6 the backstrap extension 13 may be formed from one piece of flexible material and have connection with the fore member of the harness, such as back pad F by a single strap 24, this strap 24 being provided with a return buckle 25, it being looped about the usual connection 26 on the back pad. When buckles 13' are used adjacent breech strap B, return buckle 25 may be dispensed with and straps 24 made rigid with member 26, as clearly shown in Fig. 6, as by stitching.

When adjusting the breeching to any particular animal, strap B may be positioned, as desired, either by adjustment at buckle 15 as shown in Fig. 1; by means of buckles 13' and shown in Fig. 4; or, by means of buckle 25. For instance, if it were desired to raise the back strap B to the position shown by dotted lines in Fig. 1, back straps 11 would be taken in, as by means of buckles 15. The strap A is then adjusted to be disposed, preferably in close proximity to the tail of the animal, as by releasing straps 13 from lug 19 and positioning another of the perforations of set 23 in axial alinement with the lug. If it is desired to move the strap extensions 13 either toward or from the back of the animal, strap A may also be released from lug 19 and a different perforation alined with said lug, as is obvious from an inspection of the drawings.

In connection with the form as shown in Fig. 1 it is to be observed that, should the animal throw its head to either one side or the other, such action has a tendency to elongate the side of the body opposite to which the head is thrown and inasmuch as the straps 11 cross freely upon the back of the animal, and are not retained rigid one with respect to the other by means of a housing, as is now common practice, the strap 11 adjacent its connection with the fore member of the harness will be drawn tight and there is no danger of the teeth of the animal, or parts of the bridle becoming caught thereon.

Changes in details may be made without departing from the spirit of my invention; but,

I claim:

1. In harness, the combination with a fore member thereof, of an upper breech strap; a lower breech strap; and means for retaining said straps in spaced relation and at a substantially set distance from said fore member of the harness, including strap extensions connected with said fore member and said lower breech strap, and adjustably connected with said upper breech strap.

2. In harness, the combination with a fore member thereof, of an upper breech strap; a lower breech strap; and means for retaining said straps in spaced relation and at a substantially set distance from said fore member of the harness, including strap extensions adjustably connected with said fore member and to said lower breech strap, and connected adjustably with said upper breech strap.

3. In harness, the combination with a fore member thereof, of an upper breech strap; a lower breech strap; and means for retaining said straps in spaced relation and at a substantially set distance from said fore member of the harness, including two back straps crossed in advance of said upper breech strap and having connection with the said fore member and said lower breech strap, and adjustably connected with said upper breech strap.

4. In harness, the combination with a fore member thereof, of an upper breech strap; a lower breech strap; and means for retaining said straps in spaced relation and at a substantially set distance from said fore member of the harness, including two back straps crossed in advance of said upper breech strap and having adjustable connection with said fore member and connected to said lower breech strap, and adjustably connected with said upper breech strap.

5. Breeching, comprising in combination, an upper breech strap provided with two sets of perforations intermediate its ends, a lower breech strap, a plurality of back strap extensions connected with said lower breech strap, each back strap extension having engagement with said upper breech strap adjacent said set of perforations thereof, each back strap extension provided with a set of perforations any one of which may be alined with any one of the perforations of the set in said upper breech strap adjacent to which it lies, and a securing device for said upper breech strap at each set of perforations thereof and each device including a lug adapted to be passed through the alined perforations for retaining the said parts in adjusted relation one to the other.

6. Breeching, comprising in combination, an upper breech strap provided with two sets of perforations intermediate its ends, a lower breech strap, a plurality of back strap extensions connected with said lower breech strap, each having engagement with said upper breech strap adjacent said sets of perforations thereof, each back strap extension provided with a set of perforations any one of which may be alined with any one of the perforations of the set in said upper breech strap adjacent to which it lies, and securing devices, embracing said upper breech strap and said back strap extension, one at each set of perforations of the former, and each device including a lug adapted to be passed through the alined perforations for retaining the said parts in adjusted relation one to the other.

ALEX PAULSEN.

Copies of this patent may be obtained for five cents each, by addressing the "Commissioner of Patents, Washington, D. C."